United States Patent [19]

Clem

[11] 4,245,369
[45] Jan. 20, 1981

[54] STRAIGHT SWEEP WINDSHIELD WIPER
[75] Inventor: John L. Clem, Michigan City, Ind.
[73] Assignee: Sprague Devices, Inc., Michigan City, Ind.
[21] Appl. No.: 54,276
[22] Filed: Jul. 2, 1979
[51] Int. Cl.³ .............................................. B60S 1/44
[52] U.S. Cl. ............................................... 15/250.23
[58] Field of Search ................................... 15/250.23

[56] References Cited
U.S. PATENT DOCUMENTS

| 2,624,904 | 1/1953 | Wianco | 15/250.23 |
| 2,830,314 | 4/1958 | Bitzer | 15/250.23 X |

FOREIGN PATENT DOCUMENTS

| 1,032,359 | 3/1953 | France | 15/250.23 |
| 2,385,563 | 12/1978 | France | 15/250.23 |

Primary Examiner—Christopher K. Moore
Attorney, Agent, or Firm—Oltsch, Knoblock & Hall

[57] ABSTRACT

An apparatus for driving a windshield wiper blade in an oscillatory motion over the surface of a windshield. The wiper blade is driven in a straight line over the windshield surface rather than in the usual arcuate or modified arcuate path.

5 Claims, 3 Drawing Figures

U.S. Patent   Jan. 20, 1981   4,245,369
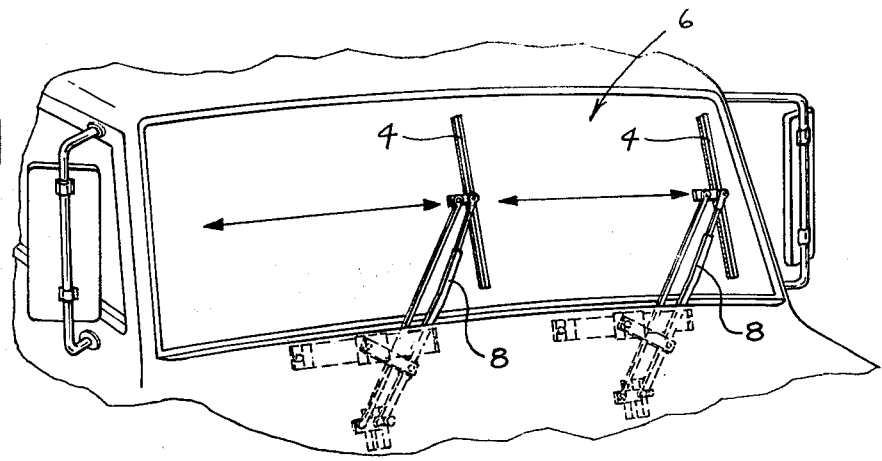
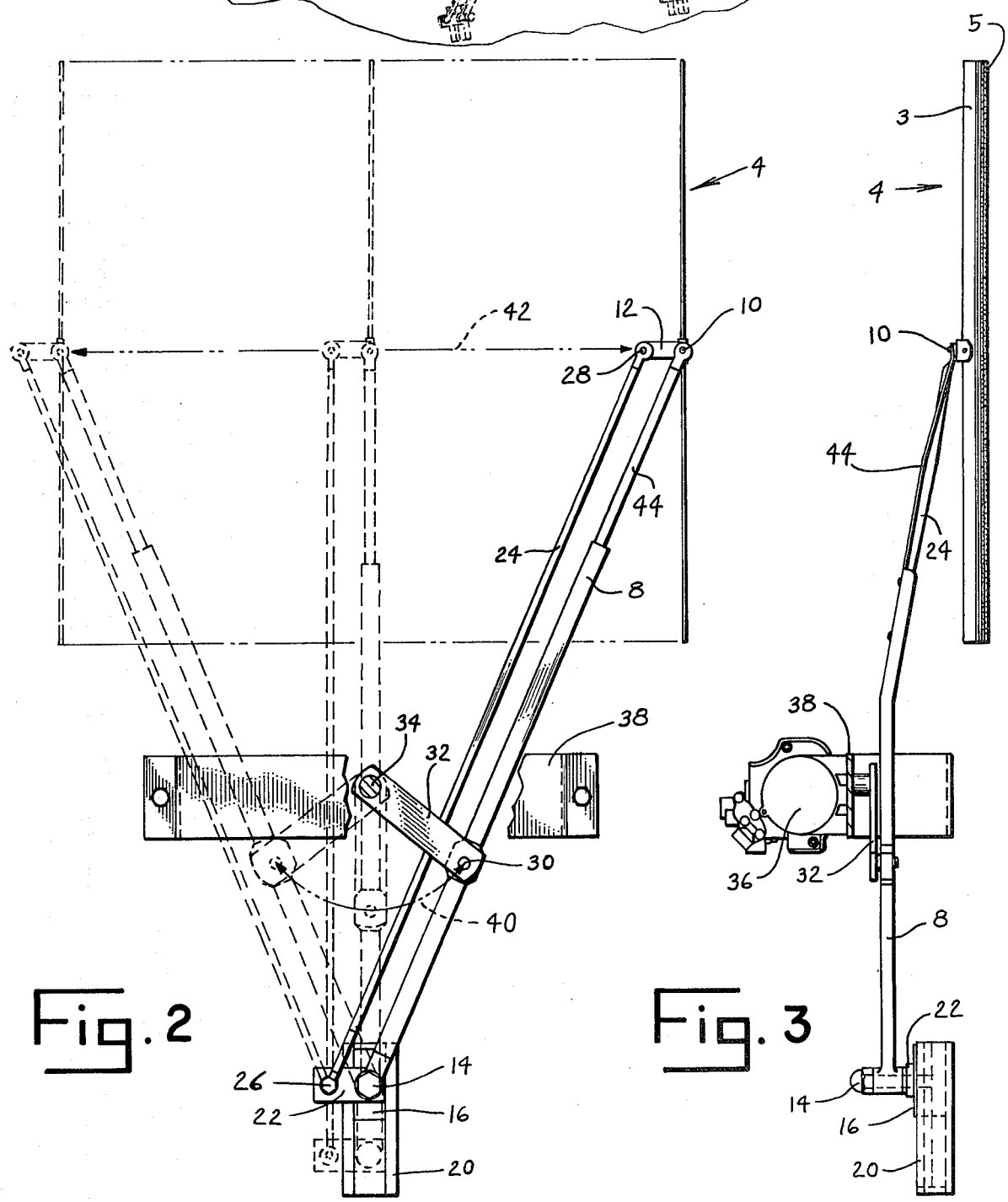
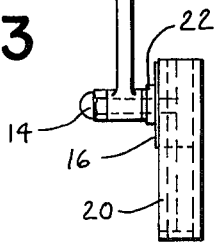

STRAIGHT SWEEP WINDSHIELD WIPER

SUMMARY OF THE INVENTION

This invention relates to an apparatus for wiping the windshields of land motor vehicles, watercraft, aircraft, and in other applications where it is desired to wipe away vision-obstructing accumulations from a window.

In the wiper of this invention, a wiper blade of common type is pivotally connected at the end of a wiper arm and is pressed against and driven across the surface of a windshield by the wiper arm. The wiper blade mounts a perpendicular link projecting from the pivot connection point. The wiper arm is pivotally connected at its opposite end to a member which is slidably received in a substantially vertical track secured to the vehicle and has a projecting perpendicular link. An elongated link spaced from the arm connects the perpendicular links of the slidable member and the blade to form a parallelogram in combination with the wiper arm. The wiper arm is pivotally connected intermediate its ends to one end of a drive bar carried by the rocking shaft of a windshield wiper motor of common and well known type. The drive bar which is attached to the wiper arm is thereby driven to swing back and forth in an arc. The arcuate swinging of the drive bar, the vertical reciprocating sliding movement of the sliding member in its track, and the parallelogram connection between the sliding member link and the wiper arm link combine to shift the wiper blade from side to side along a substantially straight line while positioned substantially vertically, i.e., the wiper blade remains perpendicular to the direction of its reciprocating movement across a windshield. The straight line wiping action provided by this wiper apparatus is particularly desirable on trucks, buses, and other large vehicles having large windshields where an unwiped windshield corner can obscure the driver's vision of a pedestrian or of a smaller motor vehicle under conditions of poor visibility. Flat or curved windshields can be wiped with this wiper. The wiper blade may be of any resilient construction so as to insure that the full length of the wiper blade contacts the windshield regardless of the contour of the windshield.

It is an object of this invention to provide a novel construction of windshield wiper apparatus which wipes along a substantially straight line.

Another object is to provide a windshield wiper in which the wiper blade remains substantially vertical on the windshield surface throughout its movement.

Another object is to provide a windshield wiper which is simple in design and inexpensive to manufacture.

Another object is to provide a windshield wiper which is rugged and durable in construction and is efficient in operation.

Other objects will be apparent from the following specification.

BRIEF DESCRIPTION OF THE DRAWINGS

FIG. 1 is a partial perspective view of a vehicle with two wipers of this invention mounted thereon.

FIG. 2 is a front elevational view of the windshield wiper.

FIG. 3 is a side elevational view of the windshield wiper.

DESCRIPTION OF THE PREFERRED EMBODIMENT

The preferred embodiment illustrated is not intended to be exhaustive nor to limit the invention to the precise form disclosed. It is chosen and described to illustrate the principles, application, and practical use of the invention to thereby better enable others to utilize the invention.

Referring to the drawings, the numeral 4 designates a wiper blade unit of common type including an elongated carrier 3 and a resilient elongated wiper member 5 mounted on the carrier, which unit is oscillated across the surface of a vehicle windshield 6 by wiper arm 8. The carrier 3 is pivoted intermediate its ends to one end of arm 8 at 10. A link 12 projects perpendicularly from the blade carrier 3 at point 10. The opposite end of wiper arm 8 is pivotally connected at 14 to a member 16 which is slidably received in a substantially vertical elongated track 20 secured to the vehicle. Slidable member 16 has a laterally projecting perpendicular arm 22 fixedly attached thereto. An elongated link 24 of the same length as arm 8 is pivoted to lateral arm 22 at 26 and is pivoted to link 12 at 28. Link 24 is parallel to wiper arm 8 and link 22 is parallel to link 12 to define a parallelogram.

Wiper arm 8 has a pivotal connection at 30 with an arm 32 mounted on shaft 34 of a windshield wiper motor 36 mounted on a bracket 38 having a fixed connection with the motor vehicle (not shown).

As arm 32 is swung or oscillated from side to side by wiper motor 36, the arm 8 swings laterally and member 16 slides in track 20 to accommodate the arc 40 in which the free end of arm 32 swings. As a result, the blade-mounting end of wiper arm 8 is shifted along the substantially straight line 42. As wiper arm 8 moves at its blade mounting end 10 across the windshield 6, the wiper blade 4 is pivoted with respect to the wiper arm 8 by the parallelogram linkage defined by the wiper arm 8, the link 12, link 24, and link 22. As a result, the wiper blade 4 is oscillated across the windshield 6 while it is maintained in a substantially vertical position and thus sweeps or cleans a substantially rectangular area of the windshield.

As shown in FIG. 3, wiper arm 8 may include a resilient section 44 which serves to press resilient member 5 of wiper blade 4 against the windshield 6. The wiper blade unit 4 may be of the straight rigid type or may be of a curved, spring biased type and is equally applicable to flat windshields and to curved windshields.

It is to be understood that this invention is not to be limited to the embodiment herein described, but that it may be modified within the scope of the appended claims.

I claim:

1. In a windshield wiper, in combination, a wiper blade having an angularly extending link; a wiper arm pivotally mounting said wiper blade adjacent said link, a track secured to a vehicle, a member slidable in said track and pivotally mounting said wiper arm, said slidable member including a laterally projecting link parallel to said first link and positioned adjacent to said arm pivot, a wiper motor having a shaft, an arm mounted on a wiper motor shaft to swing one end thereof laterally as said motor operates, the swinging end of said motor arm being pivoted to said wiper arm, and an elongated link connected to said first named links and cooperating with said first named links and said wiper arm to define a parallelogram.

2. A windshield wiper as defined in claim 1, wherein the free end of said swinging motor arm is pivoted to said wiper arm intermediate the length of said wiper arm.

3. A windshield wiper as defined in claim 1, wherein said track is substantially vertical.

4. A windshield wiper as defined in claim 1, wherein said blade mounted link and the link projecting from said slidable member are substantially parallel to each other and perpendicular to said track.

5. In a windshield wiper, in combination, a motor driven arm swinging in an arc, a windshield wiper blade having a laterally projecting part, a substantially vertical track adapted to be mounted in fixed parallel relation to a windshield spaced from the motor driven arm, a member slidable lengthwise in said track and having a laterally projecting part, and spaced parallel elongated arms pivoted to and connecting said laterally projecting parts to define a parallelogram, said swinging arm being pivotally connected to one of said parallel elongated arms.

* * * * *